United States Patent
Hecht et al.

(10) Patent No.: US 8,511,944 B2
(45) Date of Patent: Aug. 20, 2013

(54) CLAMPING DEVICE HAVING INDEPENDENTLY RESILIENT CLAMPING FINGERS FOR CLAMPING A CUTTING INSERT IN A TOOL HOLDER

(75) Inventors: Gil Hecht, Nahariya (IL); Danny Chen, Nahariya (IL)

(73) Assignee: Iscar, Ltd., Tefen (IS)

(*) Notice: Subject to any disclaimer, the term of this patent is extended or adjusted under 35 U.S.C. 154(b) by 151 days.

(21) Appl. No.: 13/239,709

(22) Filed: Sep. 22, 2011

(65) Prior Publication Data

US 2012/0082522 A1 Apr. 5, 2012

(30) Foreign Application Priority Data

Oct. 5, 2010 (IL) .......................................... 208493

(51) Int. Cl.
*B23B 27/16* (2006.01)

(52) U.S. Cl.
USPC .......................................... 407/105; 407/111

(58) Field of Classification Search
USPC .................. 407/106, 107, 111, 105, 104, 103
See application file for complete search history.

(56) References Cited

U.S. PATENT DOCUMENTS

| | | | | |
|---|---|---|---|---|
| 1,416,843 A | * | 5/1922 | Labonte | 407/69 |
| 3,314,126 A | | 4/1967 | Stier | |
| 3,466,721 A | * | 9/1969 | Binns | 407/70 |
| 3,777,341 A | * | 12/1973 | Faber | 407/114 |
| 3,792,516 A | * | 2/1974 | Mihic | 407/105 |
| 3,829,943 A | * | 8/1974 | Bartoszevicz et al. | 407/71 |
| 3,837,058 A | * | 9/1974 | Barkley et al. | 407/103 |
| 3,908,255 A | * | 9/1975 | Faber | 407/105 |
| 4,233,867 A | * | 11/1980 | Zimmerman | 82/158 |
| 7,179,021 B2 | * | 2/2007 | Shaheen | 407/107 |
| 7,347,650 B2 | * | 3/2008 | Tipu | 407/105 |
| 2011/0164933 A1 | | 7/2011 | Park et al. | |

FOREIGN PATENT DOCUMENTS

| | | |
|---|---|---|
| EP | 0 121 582 A1 | 10/1984 |
| GB | 1 075 484 A | 7/1967 |
| GB | 1 407 344 A | 9/1975 |
| JP | 09192908 A * | 7/1997 |
| JP | 2000296402 A * | 10/2000 |
| SU | 776 759 A1 | 11/1980 |
| WO | WO 2009/022757 | 2/2009 |

OTHER PUBLICATIONS

International Search Report dated Nov. 21, 2011 issued in counterpart PCT application (No. PCT/IL2011/000658).

* cited by examiner

*Primary Examiner* — Daniel Howell
*Assistant Examiner* — Nicole N Ramos
(74) *Attorney, Agent, or Firm* — Womble Carlyle

(57) ABSTRACT

A clamping device for removably securing a cutting insert in a tool holder used in turning and milling operations, where the clamping device comprises a clamping lever and an actuating member. The clamping lever includes a first and second limb extending from a central elbow, the first limb having a clamping end portion with two independently resilient clamping fingers separated by a clamping slot and the second limb being operatively connected to the actuating member. Each of the independently resilient clamping fingers has a resilience axis of rotation and an upper clamping zone in clamping contact with the cutting insert, where the resilience axes of rotation are generally parallel to the slot width of the clamping slot.

30 Claims, 5 Drawing Sheets

CLAMPING DEVICE HAVING INDEPENDENTLY RESILIENT CLAMPING FINGERS FOR CLAMPING A CUTTING INSERT IN A TOOL HOLDER

FIELD OF THE INVENTION

The present invention relates to a clamping device for securing a cutting insert in a tool holder for use in metal cutting processes in general, and for turning and milling operations in particular.

BACKGROUND OF THE INVENTION

Within the field of clamping devices for securing cutting inserts in tool holders, pin-type clamping devices are known which provide a means for securing a cutting insert within an insert receiving pocket of a tool holder and allow the cutting insert to be removed and replaced without the removal of any further components.

U.S. Pat. No. 3,314,126 discloses a pin-type locking mechanism for removably securing an indexable carbide insert in a tool holder, where one embodiment comprises an L-shaped locking member and a screw. The insert is located in a recess of the tool holder having a base surface and an end wall extending at a right angle to the base surface. The L-shaped locking member has a vertical leg, representing a clamping pin, extending above the base surface and into a central bore of the insert and a horizontal leg engaging a reduced diameter section of the screw. Rotation of the screw in one direction causes a pivoting action of the locking member whereby the clamping pin engages the central bore, thus forcing the insert against an end wall of the tool holder. This clamping force is directed solely in a direction towards the end wall.

This pin-type locking mechanism exerts no clamping force component in the direction of the base surface and relies on frictional forces between the vertical leg and the carbide insert and also between the carbide insert and the end wall to prevent any lifting or upward movement of the insert.

U.S. Pat. No. 3,908,255 discloses a pin-type clamping device for removably securing a cutting insert in a holder shank, comprising an angular lever arm and a clamping screw. The angular lever arm, situated in a recess below the insert site, has a first shank, representing a clamping pin, extending vertically through a central bore of the insert and a second shank extending horizontally in the same direction as a bottom support surface of the insert site. The clamping pin includes an upper projection and a middle projection, each extending laterally in the direction of the second shank. Rotation of the clamping screw to urge the second shank downwardly causes simultaneous rotation and sliding of the lever arm whereby the upper projection is urged against the top side of the cutting insert and the middle projection is urged against the inside of the central bore. The upper projection exerts a vertical clamping force on the cutting insert in the direction of the bottom support surface and the middle projection exerts a lateral clamping force on the cutting insert in the direction of a side support surface.

The vertical clamping force is exerted at a single point on the top side of the cutting insert.

It is an object of the present invention to provide an improved pin-type clamping device.

It is also an object of the present invention to provide an improved pin-type clamping device where the clamping pin has at least two upper clamping zones in clamping contact with the cutting insert to provide increased stability.

It is a further object of the present invention to provide an improved pin-type clamping device where each of the at least two upper clamping zones are located on independently resilient clamping fingers to provide increased stability whilst accounting for possible imperfections and inaccuracies of the cutting insert at the surface areas being clamped.

SUMMARY OF THE INVENTION

In accordance with the present invention, there is provided a clamping device for removably securing a cutting insert in a tool holder comprising a clamping lever and an actuating member, the clamping lever including a first and second limb extending from a central elbow;

the first limb having a clamping end portion with at least two independently resilient clamping fingers, and the second limb being operatively connected to the actuating member, wherein:

the at least two independently resilient clamping fingers are separated by at least one clamping slot, and each of the at least two independently resilient clamping fingers has an upper clamping zone in clamping contact with the cutting insert and a resilience axis of rotation, and wherein:

the at least one clamping slot has at least one slot width generally parallel to the at least two resilience axes of rotation.

Also in accordance with the present invention, there is provided a method of clamping a cutting insert in a tool holder by means of a clamping device comprising a clamping lever and an actuating member, the clamping lever including a first and second limb extending from a central elbow;

the first limb having a clamping end portion with at least two independently resilient clamping fingers separated by at least one clamping slot, each of the at least two independently resilient clamping fingers having an upper clamping zone and a resilience axis of rotation, and the at least one clamping slot having at least one slot width generally parallel to the at least two resilience axes of rotation, and the second limb being operatively connected to the actuating member, the method comprising the steps of:

positioning the cutting insert in an insert receiving pocket of the tool holder so that the first limb extends through a central bore of the cutting insert; and activating the actuating member until the at least two independently resilient clamping fingers exert upper clamping forces on the cutting insert.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
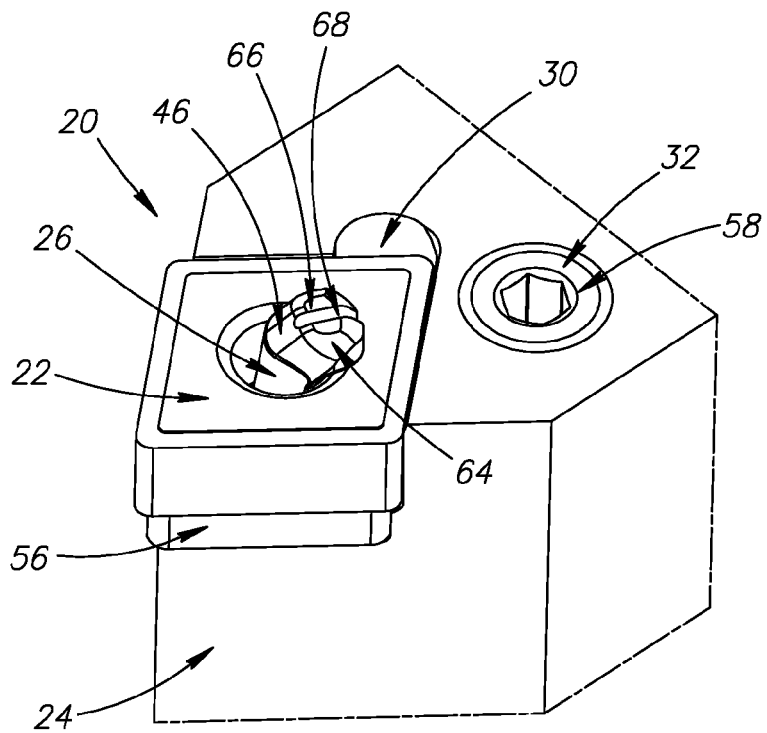
FIG. 1 is a perspective view of a clamping device in accordance with some embodiments of the present invention.
Figure 2:
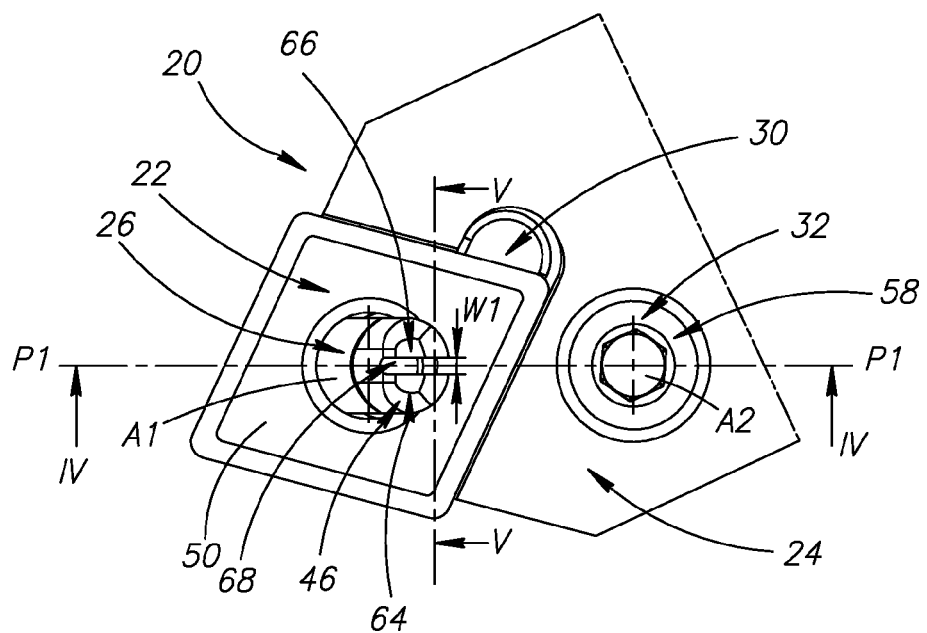
FIG. 2 is a top view of the clamping device shown in FIG. 1.
Figure 3:
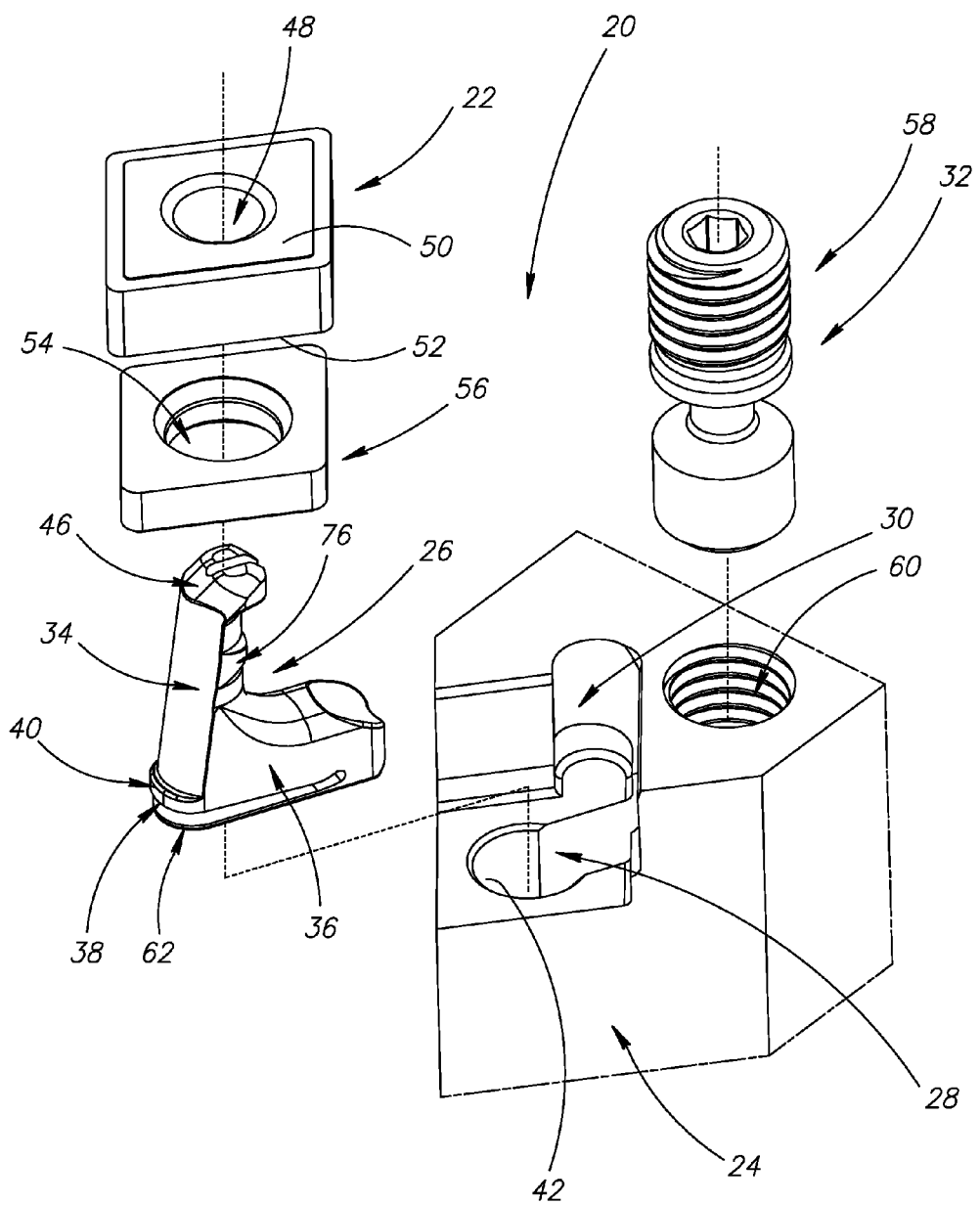
FIG. 3 is an exploded perspective view of the clamping device shown in FIGS. 1 and 2.

Attention is first drawn to FIGS. 1 to 3, showing a clamping device 20 for removably securing a cutting insert 22 in a tool holder 24 which may be used for metal cutting operations such as turning and milling, in accordance with some embodiments of the present invention.

The clamping device 20 includes a tool holder clamping lever 26 located in a lever recess 28 of an insert receiving pocket 30 of the tool holder 24 and an actuating member 32 adjacent the insert receiving pocket 30.

Figure 4:
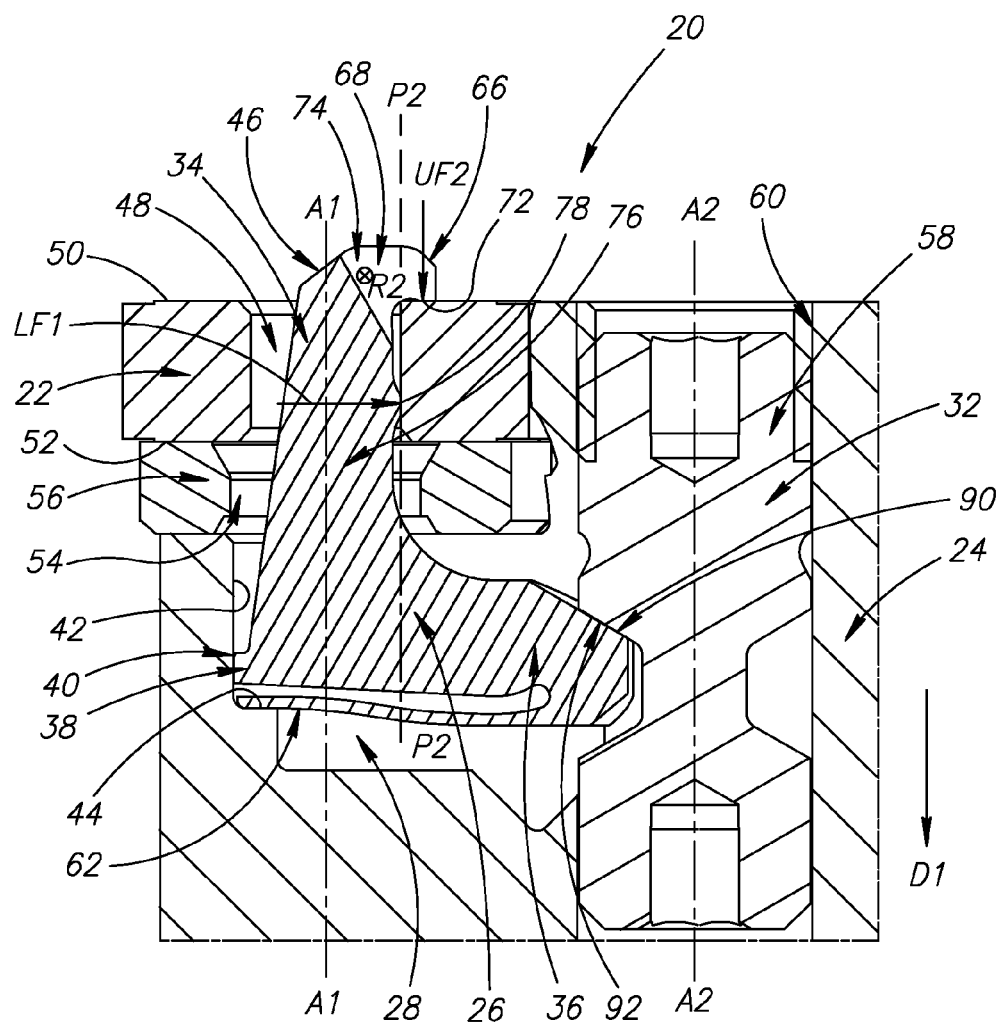
FIG. 4 is a cross-sectional view of the clamping device shown in FIG. 2 taken along the line IV-IV.

As shown in FIG. 4, the clamping lever 26 which may be manufactured from steel, has a first and second limb 34, 36 extending from a central elbow 38. The central elbow 38 has a fulcrum 40 in contact with a side wall 42 of the lever recess 28, and the first limb 34, which is effectively a clamping pin, extends away from a base surface 44 of the lever recess 28 and has a distal clamping end portion 46.

In some embodiments of the present invention, the clamping lever 26 may be generally L-shaped with the second limb 36 extending from the central elbow 38 at an approximate right angle to the first limb 34.

Also, in some embodiments of the present invention, the fulcrum 40 may be slidable along the side wall 42 in a first direction D1 towards the base surface 44.

Also, in some embodiments of the present invention, as shown in FIGS. 3 and 4, the first limb 34 is shaped and sized so that it may extend through a central bore 48 of the cutting insert 22 being clamped, the central bore 48 extending between opposing upper and lower surfaces 50, 52 and having a central axis A1 substantially parallel to the first direction D1. The first limb 34 may also extend through a through bore 54 of a support plate 56 positioned below the lower surface 52 of the cutting insert 22 in the insert receiving pocket 30.

The second limb 36 is operatively connected to the actuating member 32, with an actuable surface 90 of the second limb 36 being abutted by an actuating surface 92 of the actuating member 32 to actuate the clamping lever 26. In some embodiments of the present invention, as shown in FIGS. 3 and 4, the actuating member 32 may be in the form of a clamping screw 58 having a screw axis A2 generally parallel to the first direction D1 which interfaces with a threaded bore 60 in the tool holder 24. Activation of the actuating member 32 causes the clamping lever 26 to pivot about the fulcrum 40 and in some embodiments may cause the fulcrum 40 to slide along the side wall 42 in the first direction D1.

Also, in some embodiments of the present invention, the second limb 36 may include a resilient tongue portion 62 contacting the base surface 44 of the lever recess 28 which prevents the fulcrum 40 from sliding along the side wall 42 in the first direction D1 prior to activation of the actuating member 32.

Figure 5:
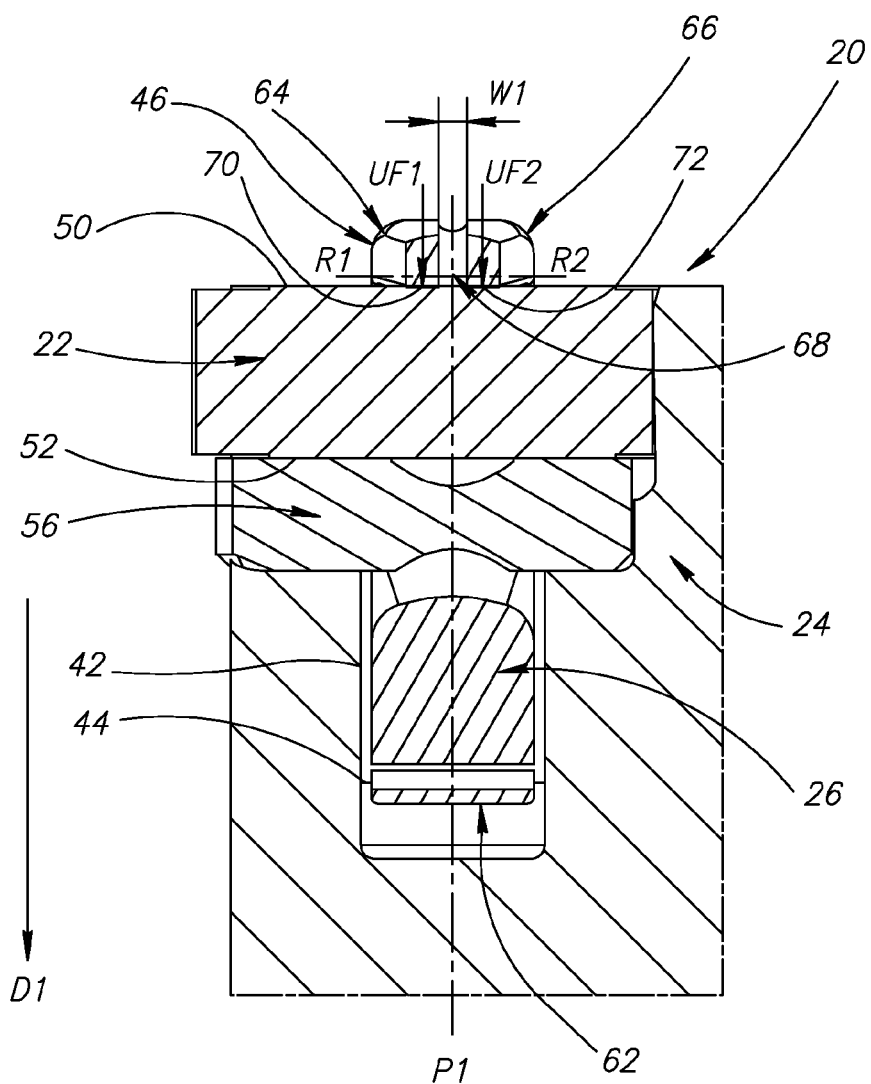
FIG. 5 is a cross-sectional view of the clamping device shown in FIG. 2 taken along the line V-V.
Figure 6:
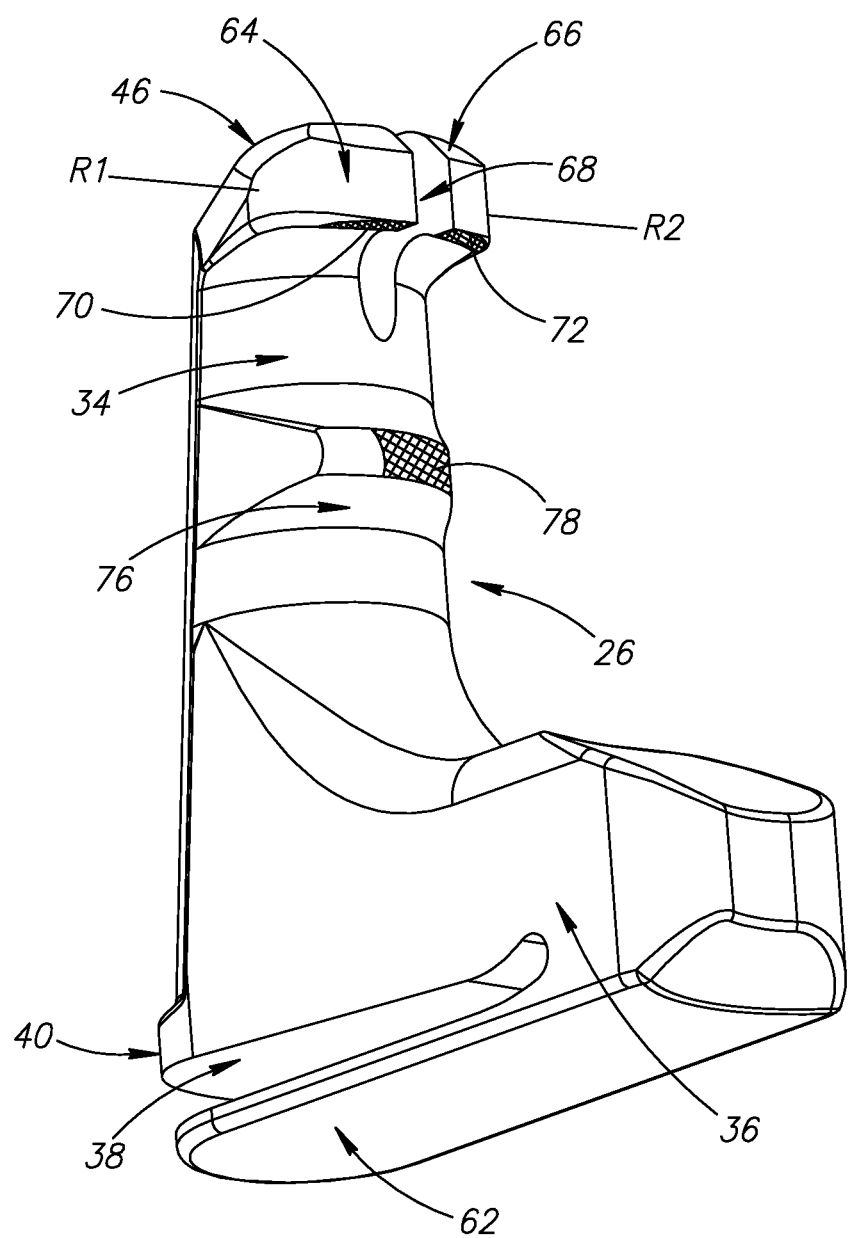
FIG. 6 is a perspective view of a clamping lever of the clamping device shown in FIGS. 1 and 2.

As shown in FIGS. 5 and 6, the clamping end portion 46 has two independently resilient clamping fingers 64, 66 separated by a clamping slot 68 extending therein, where in some embodiments of the present invention, the slot width W1 may be generally perpendicular to the first direction D1.

Also, in some embodiments of the present invention, as shown in FIG. 2, a slot plane P1 longitudinally bisecting the clamping slot 68 contains the screw axis A2.

As shown in FIGS. 5 and 6, the two independently resilient clamping fingers 64, 66 each have an upper clamping zone 70, 72 in clamping contact with the cutting insert 22 and a resilience axis of rotation R1, R2, where the slot width W1 is generally parallel to the two resilience axes of rotation R1, R2.

In some embodiments of the present invention, the upper clamping zones 70, 72 are separated by the clamping slot 68 and the two resilience axes of rotation R1, R2 are located and extend in the vicinity of a terminal end 74 of the clamping slot 68.

It should be understood that throughout the description and claims of the present invention, the term "independently resilient" is used to describe a characteristic of the two clamping fingers 64, 66, where a first upper clamping force UF1 exerted on the cutting insert 22 by a first clamping finger 64 is independent of a second upper clamping force UF2 exerted on the cutting insert 22 by a second clamping finger 66, the clamping fingers 64, 66 exerting the upper clamping forces UF1, UF2 at spaced apart clamping surfaces formed on the cutting insert 22. This independent resilience is achieved by the two clamping fingers 64, 66 being separated by the clamping slot 68 such that each clamping finger 64, 66 is able to flex or partially rotate independently about its respective resilience axis of rotation R1, R2 when initially exerting upper clamping forces UF1, UF2 on the cutting insert 22.

In some embodiments of the present invention, the flexing or partial rotation of the clamping fingers 64, 66 may result in deflection of the upper clamping zones 70, 72 by up to 0.01 mm about their respective axes of rotation R1, R2.

The provision of two independently resilient clamping fingers 64, 66 is advantageous in that each clamping finger 64, 66 can effectively exert its respective upper clamping force UF1, UF2 on the cutting insert 22, as shown in FIGS. 4 and 5, even if the cutting insert 22 has imperfections at the surface areas being clamped and/or inaccuracies introduced by indexing or replacing the cutting insert 22. In some embodiments, despite the independent resilience of their corresponding clamping fingers 64, 66, the upper clamping forces UF1, UF2 are generally parallel to one another.

In some embodiments of the present invention, as shown in FIGS. 5 and 6, the two upper clamping zones 70, 72 may be planar, transverse to the first direction D1, and in clamping contact with the upper surface 50 of the cutting insert 22.

Also, in some embodiments of the present invention, as shown in FIGS. 4 to 6, the resilience axes of rotation R1, R2 may be co-axial.

In some embodiments of the present invention, as shown in FIGS. 4 and 6, the first limb 34 may also include a clamping mid portion 76 between the clamping end portion 46 and the central elbow 38, where the clamping mid portion 76 has a lateral clamping zone 78 in clamping contact with the cutting insert 22 exerting a lateral clamping force LF1. The lateral clamping zone 78 may be in clamping contact with the central bore 48 of the cutting insert 22 and a lateral clamping plane P2 tangential to the lateral clamping zone 78 may be substantially parallel to the first direction D1.

The method of operating the clamping device 20 to secure the cutting insert 22 in the tool holder 24 can be described in the following stages:

The first stage requires the cutting insert 22 to be positioned in the insert receiving pocket 30 above the lever recess 28 so that the insert lower surface 52 faces in the first direction D1 and the first limb 34 of the clamping lever 26 extends through the insert central bore 48.

At this first stage, in some embodiments of the present invention, the resilient tongue portion 62 prevents the fulcrum 40 from sliding along the side wall 42 in the first direction D1 and is configured such that the first limb 34 extends from the central elbow 38 in a direction generally opposite to the first direction D1, thus assisting the positioning of the cutting insert 22.

Also at this first stage, the two independently resilient clamping fingers 64, 66 do not exert upper clamping forces UF1, UF2 on the cutting insert 22, and in some embodiments of the present invention, the upper clamping zones 70, 72 may be coplanar.

The second stage requires activation of the actuating member 32 until the two independently resilient clamping fingers 64, 66 exert upper clamping forces UF1, UF2 on the cutting insert 22.

In some embodiments of the present invention, activation of the actuating member 32 may equate to rotation of the clamping screw 58 in one direction about its screw axis A2, which may be performed until the clamping mid portion 76 exerts a lateral clamping force LF1 on the cutting insert 22.

At this second stage, exertion of the upper clamping forces UF1, UF2 is accompanied by independent flexing of the two independently resilient clamping fingers 64, 66 about their respective axes of rotation R1, R2, which depending on imperfections or inaccuracies at the surface areas of the cutting insert 22 being clamped may result in the two upper clamping zones 70, 72 being non-coplanar when in clamping contact with the cutting insert 22.

At this second stage, in some embodiments of the present invention, as shown in

FIG. 5, the upper clamping forces UF1, UF2 may be directed generally in the first direction D1 towards the upper surface 50 of the cutting insert 22.

Also at this second stage, in some embodiments of the present invention, as shown in FIG. 4, the lateral clamping force LF1 may be directed generally perpendicular to the first direction D1 towards the central bore 48 of the cutting insert 22.

Although the present invention has been described to a certain degree of particularity, it should be understood that various alterations and modifications could be made without departing from the spirit or scope of the invention as hereinafter claimed.

What is claimed is:

1. A clamping device (20) for removably securing a cutting insert (22) in a tool holder (24), the clamping device comprising a clamping lever (26) and an actuating member (32), the clamping lever (26) including a first and second limb (34, 36) extending from a central elbow (38);

the first limb (34) having a clamping end portion (46) with at least two independently resilient clamping fingers (64, 66), and the second limb (36) being operatively connected to the actuating member (32), wherein:

the at least two independently resilient clamping fingers (64, 66) are separated by at least one clamping slot (68), and each of the at least two independently resilient clamping fingers (64, 66) has an upper clamping zone (70, 72) in clamping contact with the cutting insert (22) and a resilience axis of rotation (R1, R2), and wherein:

the at least one clamping slot (68) has at least one slot width (W1) generally parallel to the at least two resilience axes of rotation (R1, R2).

2. The clamping device (20) according to claim 1, wherein the central elbow (38) has a fulcrum (40) in contact with a side wall (42) of a lever recess (28) in an insert receiving pocket (30) of the tool holder (24), and wherein the fulcrum (40) is slidable along the side wall (42) in a first direction (D1) and the at least two upper clamping zones (70, 72) are transverse to the first direction (D1).

3. The clamping device (20) according to claim 1, wherein the clamping lever (26) is generally L-shaped.

4. The clamping device (20) according to claim 1, wherein the clamping end portion (46) has two independently resilient clamping fingers (64, 66) and one clamping slot (68).

5. The clamping device (20) according to claim 1, wherein the at least two upper clamping zones (70, 72) are planar.

6. The clamping device (20) according to claim 2, wherein the second limb (36) includes a resilient tongue portion (62) in contact with a base surface (44) of the lever recess (28) adjacent the side wall (42).

7. The clamping device (20) according to claim 1, wherein the first limb (34) extends through a central bore (48) of the cutting insert (22).

8. The clamping device (20) according to claim 1, wherein the at least two upper clamping zones (70, 72) are separated by the at least one clamping slot (68) and the at least two resilience axes of rotation (R1, R2) are located and extend in the vicinity of at least one terminal end (74) thereof.

9. The clamping device (20) according to claim 1, wherein the at least two resilience axes of rotation (R1, R2) are co-axial.

10. The clamping device (20) according to claim 2, wherein the at least one slot width (W1) is generally perpendicular to the first direction (D1).

11. The clamping device (20) according to claim 2, wherein the actuating member (32) is in the form of a clamping screw (58) having a screw axis (A2) generally parallel to the first direction (D1).

12. The clamping device (20) according to claim 11, wherein at least one slot plane (P1) longitudinally bisecting the at least one clamping slot (68) contains the screw axis (A2).

13. The clamping device (20) according to claim 2, wherein the first limb (34) has a clamping mid portion (76) between the clamping end portion (46) and the central elbow (38), and wherein:

the clamping mid portion (76) includes at least one lateral clamping zone (78) in clamping contact with the cutting insert (22).

14. The clamping device (20) according to claim 13, wherein at least one lateral clamping plane (P2) tangential to the at least one lateral clamping zone (78) is substantially parallel to the first direction (D1).

15. The clamping device (20) according to claim 13, wherein the cutting insert (22) includes a central bore (48) having a central axis (A1) extending between opposing upper and lower surfaces (50, 52), and wherein the at least one lateral clamping zone (78) is in clamping contact with the central bore (48).

16. The clamping device (20) according to claim 15, wherein the at least two upper clamping zones (70, 72) are in clamping contact with the upper surface (50) of the cutting insert (22).

17. The clamping device (20) according to claim 15, wherein the central axis (A1) is substantially parallel to the first direction (D1).

18. A method of clamping a cutting insert (22) in a tool holder (24) by means of a clamping device (20) comprising a clamping lever (26) and an actuating member (32), the clamping lever (26) including a first and second limb (34, 36) extending from a central elbow (38);

the first limb (34) having a clamping end portion (46) with at least two independently resilient clamping fingers (64, 66) separated by at least one clamping slot (68), each of the at least two independently resilient clamping fingers (64, 66) having an upper clamping zone (70, 72) and a resilience axis of rotation (R1, R2), and the at least one clamping slot (68) having at least one slot width (W1) generally parallel to the at least two resilience axes of rotation (R1, R2), and the second limb (36) being operatively connected to the actuating member (32), the method comprising the steps of:

positioning the cutting insert (22) in an insert receiving pocket (30) of the tool holder (24) so that the first limb (34) extends through a central bore (48) of the cutting insert (22); and activating the actuating member (32) until the at least two independently resilient clamping fingers (64, 66) exert upper clamping forces (UF1, UF2) on the cutting insert (22).

19. The method according to claim 18, wherein the at least two upper clamping zones (70, 72) are separated by the at least one clamping slot (68) and the at least two resilience axes of rotation (R1, R2) are located and extend in the vicinity of at least one terminal end (74) thereof.

20. The method according to claim 18, wherein the actuating member (32) is in the form of a clamping screw (58) and the central elbow (38) has a fulcrum (40) in contact with a side wall (42) of a lever recess (28) in the insert receiving pocket (30), and wherein rotation of the clamping screw (58) in one direction about its screw axis (A2) causes the fulcrum (40) to slide along the side wall (42) in a first direction (D1).

21. The method according to claim 18, wherein the at least two upper clamping zones (70, 72) are coplanar prior to activation of the actuating member (32).

22. The method according to claim 20, wherein the second limb (36) includes a resilient tongue portion (62) in contact with a base surface (44) of the lever recess (28) adjacent the side wall (42).

23. The method according to claim 22, wherein the resilient tongue portion (62) prevents the fulcrum (40) from sliding along the side wall (42) in the first direction (D1) prior to activation of the actuating member (32).

24. The method according to claim 20, wherein the upper clamping forces (UF1, UF2) are directed generally in the first direction (D1).

25. The method according to claim 20, wherein the first limb (34) has a clamping mid portion (76) between the clamping end portion (46) and the central elbow (38), and wherein rotation of the clamping screw (58) in one direction causes the clamping mid portion (76) to exert a lateral clamping force (LF1) on the cutting insert (22) in a direction generally perpendicular to the first direction (D1).

26. The method according to claim 25, wherein the cutting insert (22) includes a central bore (48) extending between opposing upper and lower surfaces (50, 52), and wherein the upper clamping forces (UF1, UF2) are directed towards the upper surface (50) and the lateral clamping force (LF2) is directed towards the central bore (48).

27. A tool holder clamping lever (26) comprising:
a central elbow (38);

a first limb (34) extending from the central elbow (38) and comprising:
a clamping end portion (46) provided with at least two independently resilient clamping fingers (64, 66) separated by at least one clamping slot (68),
each clamping finger (64, 66) having a respective upper clamping zone (70, 72) and a respective resilience axis of rotation (R1, R2),
the at least one clamping slot (68) having a width (W1) generally parallel to the at least two resilience axes of rotation (R1, R2),
the upper clamping zones (70, 72) configured to simultaneously engage spaced apart clamping surfaces upon actuation of the tool holder clamping lever (26); and a second limb (36) extending from the central elbow (38), the second limb having an actuable surface (90) by means of which the tool holder clamping lever (26) is capable of being actuated.

28. A clamping device (20) for removably securing a cutting insert (22) in a tool holder (24), the clamping device (20) comprising the tool holder clamping lever (26) according to claim 27 in combination with an actuating member (32) having an actuating surface (92) configured to abut the clamping lever's actuable surface (90).

29. A tool holder (24) having a cutting insert (22) removably secured therein by a clamping device (20) in accordance with claim 28, wherein:
the actuating member's actuating surface (92) abuts the clamping lever's actuable surface (90); and
the first limb (34) passes through a central bore (48) of the cutting insert (22);
the upper clamping zones (70, 72) simultaneously abut spaced apart clamping surfaces formed on the cutting insert to thereby apply generally parallel upper clamping forces (UF1, UF2) to the spaced apart clamping surfaces of the cutting insert (22); and
the first limb (34) has a clamping mid portion (76) between the clamping end portion (46) and the central elbow (38), the clamping mid portion (76) including at least one lateral clamping zone (78) in clamping contact with the cutting insert's central bore (48).

30. A method of clamping a cutting insert (22) in a tool holder (24) by means of a clamping device (20) comprising a tool holder clamping lever (26) and an actuating member (32), the method comprising the steps of:
positioning the cutting insert (22) in an insert receiving pocket (30) of the tool holder (24) so that a first limb (34) of the clamping lever (26) extends through a central bore (48) of the cutting insert (22); and
activating the actuating member (32) such that:
at least two independently resilient clamping fingers (64, 66) of the tool holder clamping lever (26) exert generally parallel upper clamping forces (UF1, UF2) at spaced apart clamping surfaces of the cutting insert (22), and
a clamping mid portion (76) of the tool holder clamping lever (26) exerts a lateral force (LF1) on the cutting insert's central bore (48).

* * * * *